US011188352B2

(12) United States Patent
Delio, Jr.

(10) Patent No.: US 11,188,352 B2
(45) Date of Patent: Nov. 30, 2021

(54) ADVANCED INJECTION RULE ENGINE

(71) Applicant: Riverbed Technology, Inc., San Francisco, CA (US)

(72) Inventor: John J. Delio, Jr., Manchester, NH (US)

(73) Assignee: Riverbed Technology, Inc., San Francisco, CA (US)

( * ) Notice: Subject to any disclaimer, the term of this patent is extended or adjusted under 35 U.S.C. 154(b) by 17 days.

(21) Appl. No.: 16/140,354

(22) Filed: Sep. 24, 2018

(65) Prior Publication Data

US 2019/0026130 A1  Jan. 24, 2019

Related U.S. Application Data

(63) Continuation-in-part of application No. 15/347,496, filed on Nov. 9, 2016.

(60) Provisional application No. 62/563,543, filed on Sep. 26, 2017, provisional application No. 62/253,531, filed on Nov. 10, 2015.

(51) Int. Cl.
| | | |
|---|---|---|
| *G06F 9/44* | (2018.01) | |
| *G06F 9/445* | (2018.01) | |
| *G06F 11/36* | (2006.01) | |
| *G06F 8/54* | (2018.01) | |
| *G06F 9/455* | (2018.01) | |
| *G06F 11/34* | (2006.01) | |

(52) U.S. Cl.
CPC ............ *G06F 9/44521* (2013.01); *G06F 8/54* (2013.01); *G06F 9/45504* (2013.01); *G06F 11/3644* (2013.01); *G06F 11/3466* (2013.01); *G06F 2201/865* (2013.01)

(58) Field of Classification Search
CPC .... G06F 9/44521; G06F 9/45504; G06F 8/54; G06F 11/3644; G06F 11/3466; G06F 2201/865
See application file for complete search history.

(56) References Cited

U.S. PATENT DOCUMENTS

| | | |
|---|---|---|
| 5,381,534 A | 1/1995 | Shi |
| 6,463,583 B1 | 10/2002 | Hammond |
| 6,546,553 B1 | 4/2003 | Hunt |
| 7,043,469 B2 | 5/2006 | Goralwalla et al. |
| 7,188,122 B2 | 3/2007 | Smith et al. |
| 8,250,214 B2 | 8/2012 | Susai et al. |
| 8,683,193 B1 | 3/2014 | Hansen |
| 8,798,053 B2 | 8/2014 | Sunell et al. |
| 2005/0240906 A1 | 10/2005 | Kinderknecht et al. |
| 2008/0172681 A1 | 7/2008 | Donald et al. |

(Continued)

OTHER PUBLICATIONS

Olah et al. (A Model Based Framework for Specifying and Executing Fault Injection Experiments, 2009) (Year: 2009).*

*Primary Examiner* — Chat C Do
*Assistant Examiner* — Lenin Paulino
(74) *Attorney, Agent, or Firm* — Park, Vaughan, Fleming & Dowler LLP; Laxman Sahasrabuddhe

(57) ABSTRACT

Systems and techniques are described for controlling injection of a library into a process. Specifically, some embodiments provide an Advanced Injection Rule Engine (AIRE), which uses a set of rules to selectively inject a library, e.g., a dynamic-link library (DLL), into a process. Some embodiments implement a Domain Specific Language (DSL), called AIRE Script, to define the injection rules that are used by the AIRE at runtime.

19 Claims, 3 Drawing Sheets

(56) References Cited

U.S. PATENT DOCUMENTS

| | | | |
|---|---|---|---|
| 2009/0052440 A1 | 2/2009 | Pfeffer et al. | |
| 2009/0249368 A1 | 10/2009 | Needamangala et al. | |
| 2009/0271172 A1 | 10/2009 | Mejdrich et al. | |
| 2009/0282289 A1 | 11/2009 | Nori et al. | |
| 2010/0088688 A1 | 4/2010 | Edwards et al. | |
| 2011/0271289 A1 | 11/2011 | Weiser et al. | |
| 2012/0158619 A1* | 6/2012 | Dani | G06N 5/025 |
| | | | 706/12 |
| 2012/0233612 A1* | 9/2012 | Beckett | G06F 9/45516 |
| | | | 718/1 |
| 2012/0304160 A1 | 11/2012 | Soeder | |
| 2013/0041756 A1 | 2/2013 | Carion et al. | |
| 2014/0156716 A1 | 6/2014 | Baptist et al. | |
| 2014/0304720 A1 | 10/2014 | Yu et al. | |
| 2014/0359582 A1 | 12/2014 | Needamangala et al. | |
| 2015/0356675 A1* | 12/2015 | Schulz | G06Q 40/04 |
| | | | 705/37 |
| 2016/0070551 A1* | 3/2016 | Miller | G06F 16/9577 |
| | | | 717/148 |
| 2017/0032147 A1* | 2/2017 | Denner | H04W 12/02 |
| 2017/0104756 A1* | 4/2017 | Rosenthal | H04L 63/20 |
| 2019/0303175 A1* | 10/2019 | Irani | G06F 9/44521 |

* cited by examiner

ADVANCED INJECTION RULE ENGINE

RELATED APPLICATION

This application claims benefit of U.S. Provisional Patent Application No. 62/563,543, entitled "Advanced Injection Rule Engine (AIRE)," by the same inventor, filed on 26 Sep. 2017, the contents of which are herein incorporated by reference in their entirety for all purposes.

This application is a continuation-in-part application of pending U.S. patent application Ser. No. 15/347,496, entitled "Target process injection prior to execution of marker libraries," by the same inventor, filed on 9 Nov. 2016, the contents of which are herein incorporated by reference in their entirety for all purposes. U.S. patent application Ser. No. 15/347,496 claims the benefit of U.S. Provisional Application No. 62/253,531, entitled "Kernel Mode Mid Image Load Injection," by the same inventor, filed 10 Nov. 2015, the contents of which are herein incorporated by reference in their entirety for all purposes.

The subject matter of this application relates to the subject matter of U.S. patent application Ser. No. 14/211,359 (which issued as U.S. Pat. No. 9,465,717), entitled "Native code profiler framework," by the same inventor, filed on 14 Mar. 2014, the contents of which are herein incorporated by reference in their entirety for all purposes. U.S. patent application Ser. No. 14/211,359 claims the benefit of U.S. Provisional Application No. 61/781,856, entitled "Native code profiler framework," by the same inventor, filed 14 Mar. 2013, the contents of which are herein incorporated by reference in their entirety for all purposes.

BACKGROUND

The present disclosure generally relates to injecting a library into a process. More specifically, the present disclosure relates to using a set of rules to identify a target process for injecting a library.

Instrumentation of software application code is a process of inserting additional instructions into the code stream to enable measurement of one or more properties of the code while executing in an environment. This enables visibility into processor and memory usage of applications on a given system. But it is not usually possible to view what code is executing within a process. A debugger may allow a step-through of code to view code execution, but this requires a debugger to be installed and knowledge of where to place appropriate break points. Debugging also interrupts normal program flow at the break points and only one debugger may be used at a time.

Some existing techniques require users to modify their scripts or use an environment variable (e.g., the "JAVA_TOOL_OPTIONS" environment variable in Java™ virtual machine) to inject profiling code into a process. However, these techniques involve tedious configuration steps and/or cause unnecessary injection of code into processes.

SUMMARY

Some embodiments described herein provide techniques and systems that allow users, or components within various products, to create rules for determining if injection of a library into a process should be performed. Specifically, some embodiments provide an Advanced Injection Rule Engine (AIRE), which uses a set of rules to selectively inject a library, e.g., a dynamic-link library (DLL), into a process. Some embodiments implement a Domain Specific Language (DSL), called AIRE Script, to define the injection rules that are used by the AIRE at runtime. Unlike a basic solution, e.g., using the image name of the process, AIRE instead allows for numerous properties and environment information to be used while making the decision to inject or instrument.

During operation, a set of rules can be created to control injection of the library. Next, some embodiments can apply the set of rules to a process executing on a computer. Specifically, applying the set of rules to the process can comprise: (1) selecting a rule from the set of rules, (2) evaluating a condition specified in the selected rule, wherein the condition is defined over a set of properties associated with the process, and (3) in response to the condition evaluating as true, performing an injection action specified in the rule. Some embodiments can, in response to the condition evaluating as false, select a next rule from the set of rules to apply to the process.

In some embodiments, the rules are selected from the set of rules in a predetermined order. Specifically, in some embodiments, the rules are selected in the order in which they were defined by a user (e.g., in the order in which they appear in a file that contains the rules).

In some embodiments, the set of properties can include one or more of: (1) a name of an executable image of the process, (2) a filesystem path of the executable image of the process, (3) a processor architecture of the executable image of the process, (4) a version of the executable image of the process, (5) an indicator that specifies whether a particular library is loaded within the process, (6) a user identifier associated with the process, (7) an environment variable of the process, or (8) information about command line arguments that were provided when the process was executed.

In some embodiments, if the rule is an activation rule, then performing the injection action can comprise injecting the library into the process. On the other hand, if the rule is a deactivation rule, then performing the injection action can comprise (1) not injecting the library into the process, and (2) not applying any additional rules in the set of rules to the process (i.e., the conditions specified any remaining rules are not evaluated).

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein. In this disclosure, when the term "and/or" is used with a list of entities, it refers to all possible combinations of the list of entities. For example, the phrase "X, Y, and/or Z" covers the following cases: (1) only X; (2) only Y; (3) only Z; (4) X and Y; (5) X and Z; (6) Y and Z; and (7) X, Y, and Z. Additionally, in this disclosure, the term "based on" means "based solely or partially on."

According to one definition, a computer is any device that is capable of performing computations. In some embodiments, a computer can include a processing mechanism that is capable of executing instructions stored on a storage medium. Examples of computers include, but are not limited to, handheld computers, laptop computers, desktop computers, distributed computers, printers, appliances, etc.

According to one definition, a data communication network (or "network" for short) is an interconnection of one or more devices that is capable of delivering information from one computer to another computer. Examples of networks include, but are not limited to, wireless and wired networks, local area networks (LANs), metropolitan area networks (MANs), wide area networks (WANs), private networks, public networks, intranets, internets, etc. Data communication networks often include a variety of network devices for sending, receiving, directing, and optimizing network data traffic.

Figure 1A:
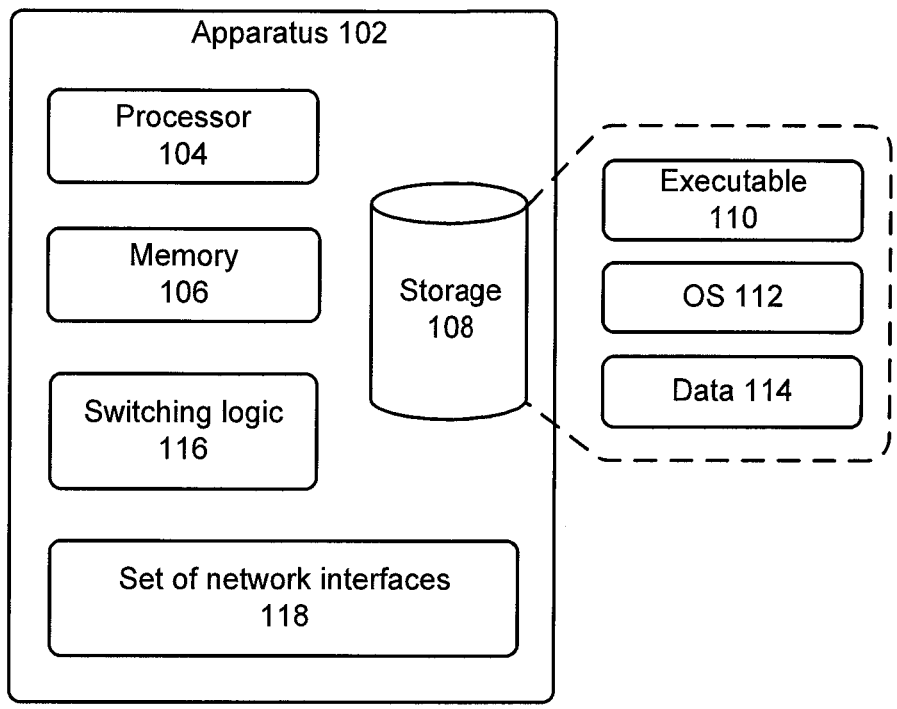
FIGS. 1A-1B illustrates an apparatus in accordance with some embodiments described herein.

FIG. 1A illustrates an apparatus in accordance with some embodiments described herein. Apparatus 102 (e.g., a computer, a web server, an application server, etc.) comprises processor 104, memory 106 (e.g., a volatile or non-volatile random access memory), and storage 108 (e.g., a flash memory device or a disk drive). Storage 108 can store executable 110, operating system 112, and data 114. The components in apparatus 102 can communicate with one another using a communication mechanism, e.g., a bus, a backplane, and/or a switching fabric. Executable 110 can include instructions that, when executed by processor 104, cause apparatus 102 to perform one or more methods that are implicitly or explicitly described in this disclosure. Data 114 can include any data that is inputted into or outputted by executable 110.

Apparatus 102 can also include switching logic 116 and set of network interfaces 118. Set of network interfaces 118 can be used to transmit data to and/or receive data from other communication devices. Switching logic 116 can forward network traffic received on one or more network interfaces in accordance with switching/forwarding/routing information stored in apparatus 102. Specifically, switching logic 116 can be configured by processor 104 in accordance with one or more methods that are implicitly or explicitly described in this disclosure.

Figure 1B:
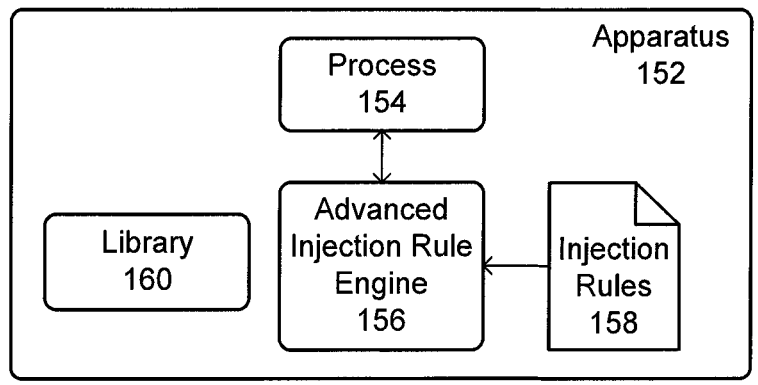

FIG. 1B illustrates a logical view of an apparatus in accordance with some embodiments described herein. Apparatus 152 can include an executing process 154, AIRE 156, injection rules 158, and library 160. AIRE 156 can be an executing process itself, or it can be a module that is invoked by an executing process at runtime. Injection rules 158 can be stored on a storage medium, e.g., storage 108 in FIG. 1A. In some embodiments, AIRE 156 can apply injection rules 158 to process 154 to decide whether or not to inject library 160 into process 154.

The techniques and systems described in this disclosure can generally be used with any injection method for injecting library 160 into process 154. Some techniques for injecting library 160 into process 154 are described in (1) pending U.S. patent application Ser. No. 15/347,496, entitled "Target process injection prior to execution of marker libraries," and (2) U.S. Pat. No. 9,465,717, entitled "Native code profiler framework." The contents of U.S. patent application Ser. No. 15/347,496 and U.S. Pat. No. 9,465,717 are herein incorporated by reference to provide non-limiting examples of techniques for injecting a library into a process.

There have been numerous cases where customers could have benefited from a powerful and extensible framework to determine if a process should be injected with a library (e.g., an instrumentation library). AIRE provides such a framework. As one can imagine, various applications have differing properties that make the determination of injection unique. Sometimes users would like to make use of the image name, processor architecture, an environment variable, command line arguments, file properties such as company name, executing user, a library loaded, image path, etc. All of these and more can be specified in injection rules 158 by using a DSL, and are available for use within the AIRE framework. Moreover, the AIRE framework is extensible so that it can allow us to increase the number of available properties from which rules can be created. Specifically, a user can define the rules by using a DSL that includes constructs for specifying the conditions and the actions that are used by AIRE 156 at runtime to control injection of library 160 into process 154. An example of a DSL is shown below in reference to FIGS. 3A-3B.

Figure 2:
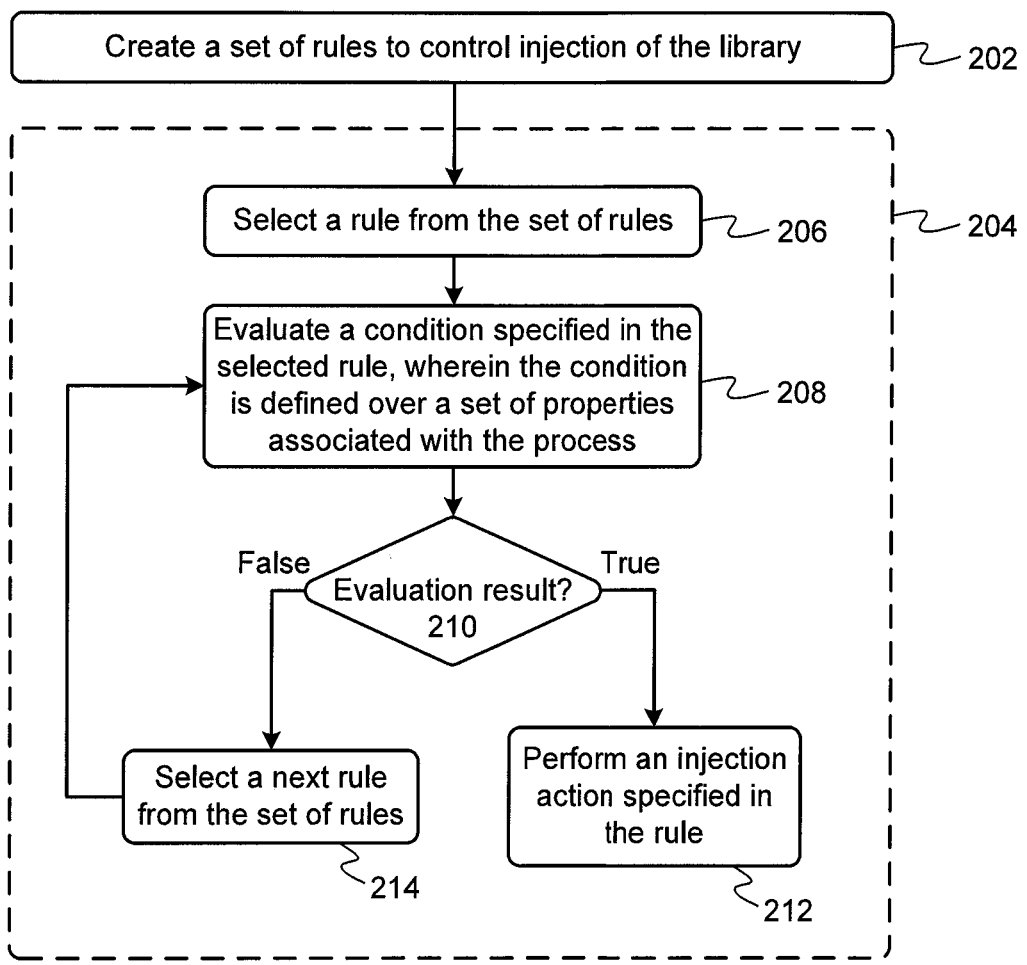
FIG. 2 illustrates a process for controlling injection of a library in accordance with some embodiments described herein.

FIG. 2 illustrates a method for controlling injection of a library in accordance with some embodiments described herein. The method can begin by creating a set of rules to control injection of the library (step 202). The rules can be defined in a human-readable DSL, as explained below in reference to FIGS. 3A-3B. Next, the method can apply the set of rules to a process that is executing on a computer (step 204). Specifically, the set of rules can be applied by first selecting a rule from the set of rules (step 206). The method can then evaluate a condition specified in the selected rule, wherein the condition is defined over a set of properties associated with the process (step 208). Next, depending on the evaluation result (step 210), the method can take different branches as illustrated in FIG. 2. In particular, in response to the condition evaluating as true, the method can perform an injection action specified in the rule (step 212). On the other hand, in response to the condition evaluating as false, the method can select a next rule from the set of rules to apply to the process (step 214), and return to step 208. If no more rules are left for processing, then the method can terminate.

In some embodiments, rules can be selected from the set of rules in a predetermined order. For example, if the rules are stored in a file, then the rules can be selected in the order in which they appear in the file. In another example, if each rule is associated with a priority or an index, then the priority or index can be used to decide the order in which the rules are selected by the AIRE.

The action specified in a rule can instruct the AIRE to inject the library into the process. On the other hand, the action specified in a rule can instruct the AIRE to (1) not inject the library into the process, and (2) not apply any additional rules in the set of rules to the process. For example, suppose injection rules 158 in FIG. 1B contains set of three rules, and the first rule is a deactivation rule and the other two rules are activation rules. Further, suppose that the rules are being applied in the order in which they appear in injection rules 158. In this example, if the condition of the first rule (which is a deactivation rule) is satisfied, then the library will not be injected into the process, and no more rules will be processed by the AIRE. On the other hand, if the condition of the first rule is not satisfied, then the condition of the second rule is evaluated. If the condition of the second rule (which is an activation rule) is satisfied, then the library is injected into the process with a set of command line arguments that may optionally be specified in the second rule. In some embodiments, the rules are processed until one of the conditions is satisfied; any remaining rules are not processed. In the present example, the third rule is not processed if the condition of the second rule is satisfied. On the other hand, if the condition of the second rule is not satisfied, then the condition of the third rule is evaluated, and if that condition is satisfied then the AIRE injects the library with a set of command line arguments which may optionally be specified in the third rule.

In some embodiments, the set of properties that can be used to define the condition in a rule can include one or more of (1) a name of an executable image of the process, (2) a filesystem path of the executable image of the process, (3) a processor architecture of the executable image of the process, (4) a version of the executable image of the process, (5) an indicator that specifies whether a particular library is loaded within the process, (6) a user identifier associated with the process, (7) an environment variable of the process, or (8) information about command line arguments that were provided when the process was executed. The following table summarizes a set of properties and classes that can be used to define a condition in an injection rule. The following table is for illustration purposes only, and is not intended to limit the scope of this disclosure. Because the AIRE framework is extensible, more properties can be added to this list.

| Object | Description |
|---|---|
| Image.Name | The name of the primary module or binary of the currently running process. |
| Image.Path | The path of the primary module or binary of the currently running process. |
| Image.Architecture | The processor architecture of the image and therefore of the currently running process. |
| Image.GetVersionInfoString(String name) | Returns the value of the specified version information property as a string. |
| Image.IsLibraryLoaded(String libraryName) | Returns a Boolean value indicating if the specified library is loaded within the currently running process. |
| Process.User | Returns the user account as a String associated with the currently running process. |
| Process.Environment[String name] | Returns the string value of the specified environment variable as it exists within the currently running process. |
| Process.CommandLine[int index] | Returns the string value of the specified command line argument. |
| Process.CommandLine.Length | Returns the number of arguments specified in the command line of the currently running process. |
| Process.CommandLine.Contains (String) | Returns a Boolean value indicating if the specified argument was specified. |
| Process.CommandLine.ContainsSequence(String[ ] sequence) | Returns a Boolean value indicating if the specified sequence of arguments is specified in the command line. |
| Process.CommandLine.GetRelativeFromValue(String start, int offset) | Returns the value of the argument at the specified offset from the found location of the start string. |
| Process.CommandLine.GetRelativeFromSequence(String[ ] sequence, int offset) | Returns the value of the argument at the specified offset from the found location of the specified sequence. |
| String.Compare(String string1, String string2) | Performs a case sensitive comparison and returns a numeric value indicating the comparison. Zero indicates that the strings are the same. |
| String.CompareNoCase(String string1, String string2) | Performs a case insensitive comparison and returns a numeric value indicating the comparison. Zero indicates that the strings are the same. |
| String.Concat(String string1, String string2) | Concatenates the two specified strings and returns the result. |
| String.IndexOf(String source, String searchString) | Returns the zero based index of the search string within the source string. −1 indicates that the search string was not found. |
| String.Length(String str) | Returns the length of the specified string. |
| String.BeginsWith(String source, String comperand) | Returns a Boolean value indicating if the source string begins with the comperand. Case sensitive. |
| String.BeginsWithNoCase(String source, String comperand) | Returns a Boolean value indicating if the source string begins with the comperand. Case insensitive. |
| String.EndsWith(String source, String comperand) | Returns a Boolean value indicating if the source string ends with the comperand. Case sensitive. |
| String.EndsWithNoCase(String source, String comperand) | Returns a Boolean value indicating if the source string ends with the comperand. Case insensitive. |
| String.SubString(String source, int startIndex, int length) | Returns a substring. |

Figure 3A:
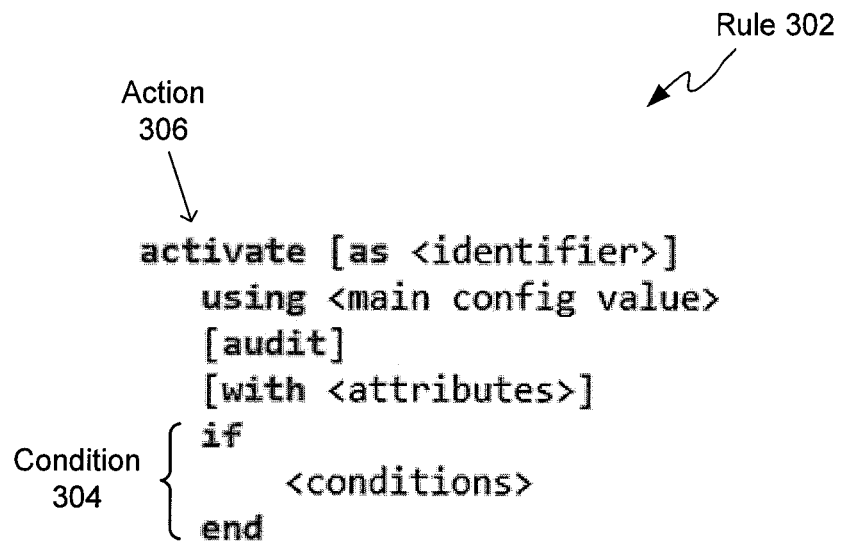
FIGS. 3A-3B illustrate a DSL syntax for defining injection rules in accordance with some embodiments described herein.
Figure 3B:
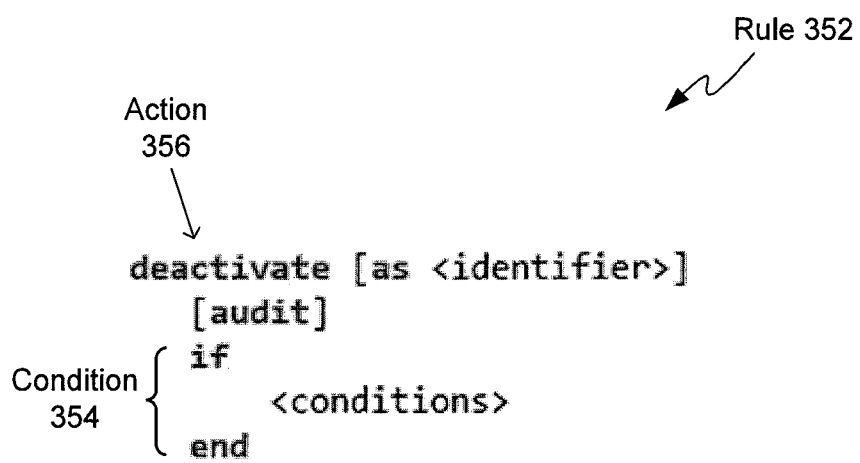

FIGS. 3A-3B illustrate a DSL syntax for defining injection rules in accordance with some embodiments described herein. FIG. 3A illustrates an activation rule, and FIG. 3B illustrates a deactivation rule. Specifically, each rule includes a condition and an action. For example, rule 302 includes condition 304 and action 306, and rule 352 includes condition 354 and action 356. The rule syntax shown in FIGS. 3A-3B is for illustration purposes only, and is not intended to limit the scope of this disclosure. The DSL syntax shown in FIGS. 3A-3B is self-explanatory. However, for the sake of completeness, a detailed explanation of the DSL syntax is provided below.

In FIGS. 3A-3B, the keywords "activate" and "deactivate" are used for specifying the action in a rule, and an "if-end" block is used for specifying the condition in the rule. The condition can generally be any logical function that is defined over one or more properties of the process. If an activation rule's condition is satisfied, then the injection of the library occurs, and the configuration and attribute values specified in the activation rule are passed to the injected library for additional processing. If a deactivation rule's condition is satisfied, then the library is not injected, and no additional rules are processed.

In FIGS. 3A-3B, square brackets indicate optional elements in the DSL syntax. The keyword "as" allows a user to define a name to be associated with the rule. The keyword "using" can be used to specify a value to be associated as the main value of the activation. The injected library can use of this value for additional processing. The keyword "with" can be used to specify additional values to be given to the injection library for processing. The keyword "audit" indicates whether or not the execution of the rule is desired to be logged. Specifically, if a rule includes the "audit" keyword, then the execution of the rule is logged. Logging the execution of rules allows users to determine the order of rules executed for a given process and to determine which, if any, rule conditions were satisfied.

An advantage of embodiments described herein is that a company's products, customers, and support will now be able to finely tune the injection of a library into a process. AIRE allows for only the necessary processes to be injected. Also, if a particular profiler library is incompatible with a specific application or a class of applications, then AIRE provides the control that would be required in such situations to disable injection for just the offending application while still allowing injection for other applications to continue.

The data structures and code described in this disclosure can be partially or fully stored on a non-transitory computer-readable storage medium and/or a hardware module and/or hardware apparatus. A non-transitory computer-readable storage medium includes all computer-readable storage mediums with the sole exception of a propagating electromagnetic wave or signal. Specifically, a non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a non-transitory computer-readable storage medium or device, so that when a computer system reads and executes the code and/or data, the computer system performs the associated methods and processes. The methods and processes can also be partially or fully embodied in hardware modules or apparatuses. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for controlling injection of a library into a process executing on a computer, the method comprising:
    creating a set of rules to control injection of the library, wherein each rule is specified in a domain specific language having a syntax comprising an action statement and a condition statement, wherein the action statement includes a first keyword associated with activation or a second keyword associated with deactivation, and wherein the condition statement specifies a logical function that is defined over one or more properties of the process; and
    applying, by an injection rule engine (IRE) executing on the computer, the set of rules to the process executing on the computer, wherein said applying comprises:
        selecting, by the IRE, a rule from the set of rules,
        evaluating, by the IRE, a condition specified in the selected rule, wherein the condition is defined over a set of properties associated with the process, wherein the set of properties includes an executable image name of the process, and
        in response to the condition evaluating as true, performing, by the IRE, an injection action specified in the rule on the process.

2. The method of claim 1, wherein rules are selected from the set of rules in a predetermined order.

3. The method of claim 2, wherein in response to the condition evaluating as false, selecting a next rule from the set of rules to apply to the process.

4. The method of claim 1, wherein performing the injection action comprises injecting the library into the process.

5. The method of claim 1, wherein performing the injection action comprises (1) not injecting the library into the process, and (2) not applying any additional rules in the set of rules to the process.

6. The method of claim 1, wherein the set of properties includes a filesystem path of the executable image of the process.

7. The method of claim 1, wherein the set of properties includes a version of the executable image of the process.

8. The method of claim 1, wherein the set of properties includes an indicator that specifies whether a particular library is loaded within the process.

9. The method of claim 1, wherein the set of properties includes command line arguments that were provided when the process was executed.

10. The method of claim 1, wherein the set of properties includes an environment variable of the process.

11. The method of claim 1, wherein the set of properties includes a processor architecture of the executable image of the process.

12. The method of claim 1, wherein the set of properties includes a user identifier associated with the process.

13. The method of claim 1, wherein the library is an instrumentation library which, when injected into the process, provides visibility into processor and memory usage of the process.

14. A non-transitory computer-readable storage medium storing instructions that, when executed by a computer, cause the computer to:
- create a set of rules to control injection of the library, wherein each rule is specified in a domain specific language having a syntax comprising an action statement and a condition statement, wherein the action statement includes a first keyword associated with activation or a second keyword associated with deactivation, and wherein the condition statement specifies a logical function that is defined over one or more properties of the process; and
- apply, by an injection rule engine (IRE) executing on the computer, the set of rules to a process executing on the computer, wherein said applying comprises:
    - selecting, by the IRE, a rule from the set of rules,
    - evaluating, by the IRE, a condition specified in the selected rule, wherein the condition is defined over a set of properties associated with the process, wherein the set of properties includes an executable image name of the process, and
    - in response to the condition evaluating as true, performing, by the IRE, an injection action specified in the rule on the process.

15. The non-transitory computer-readable storage medium of claim 14, wherein rules are selected from the set of rules in a predetermined order.

16. The non-transitory computer-readable storage medium of claim 15, wherein in response to the condition evaluating as false, selecting a next rule from the set of rules to apply to the process.

17. The non-transitory computer-readable storage medium of claim 14, wherein performing the injection action comprises injecting the library into the process.

18. The non-transitory computer-readable storage medium of claim 14, wherein performing the injection action comprises (1) not injecting the library into the process, and (2) not applying any additional rules in the set of rules to the process.

19. An apparatus, comprising:
a processor; and
a non-transitory computer-readable storage medium storing instructions that, when executed by the processor, cause the processor to:
- create a set of rules to control injection of the library, wherein each rule is specified in a domain specific language having a syntax comprising an action statement and a condition statement, wherein the action statement includes a first keyword associated with activation or a second keyword associated with deactivation, and wherein the condition statement specifies a logical function that is defined over one or more properties of the process; and
- apply, by an injection rule engine (IRE) executing on the processor, the set of rules to a process executing on the processor, wherein said applying comprises:
    - selecting, by the IRE, a rule from the set of rules,
    - evaluating, by the IRE, a condition specified in the selected rule, wherein the condition is defined over a set of properties associated with the process, wherein the set of properties includes an executable image name of the process, and
    - in response to the condition evaluating as true, performing, by the IRE, an injection action specified in the rule on the process.

\* \* \* \* \*